United States Patent Office 2,833,618
Patented May 6, 1958

2,833,618

SEPARATING URANIUM CONTAINING SOLIDS SUSPENDED IN A LIQUID

Edward C. Creutz, Santa Fe, N. Mex., and Eugene P. Wigner, Chicago, Ill., assignors to the United States of America as represented by the United States Atomic Energy Commission No Drawing. Application May 28, 1945
Serial No. 596,218

7 Claims. (Cl. 23—14.5)

Our invention relates to the separation of matter and particularly to the separation of uranium solids in suspension in deuterium oxide from deuterium oxide.

It is known that element $94^{239}$, usually referred to as plutonium, can be produced in a device known as a neutronic reactor. In such a device, which includes uranium containing a fissionable uranium isotope and a moderator, the isotope $U^{235}$ can be split or fissioned by bombardment with thermal neutrons i. e., neutrons in thermal equilibrium with the surrounding medium, to provide a self-sustaining chain reacting system. In a properly designed neutronic reactor the fission neutrons produced give rise to new fission neutrons in sufficiently large numbers to overcome the neutron losses in the reactor. However, most of the neutrons arising from the fission process are set free with a very high energy and must be slowed down to thermal energies by a moderator before they are most effective to produce fresh fission by bombardment of additional $U^{235}$ atoms. The moderator used must effectively slow the neutrons to thermal energies without much absorption by the moderator; and then the neutrons must enter the uranium. Deuterium, in the form of deuterium oxide or heavy water is an ideal moderator in that it has the ability to slow fast neutrons to thermal energy levels with very few collisions and that it has a very low neutron capture cross-section.

During the interchange of neutrons from their point of origin to their point of utilization in fission, neutrons may be lost in four ways; by absorption in the uranium metal or compound, by absorption in the moderator, by absorption in impurities present in the system, and by leakage from the system. Natural uranium and its compounds have a ratio of $U^{235}$ isotope to $U^{238}$ isotope of 1 to 139. Particularly because of this $U^{238}$ content natural uranium has an especially strong absorbing power for neutrons when they have been slowed down to moderate velocities or so called resonance energies. The absorption in uranium at these energies is termed the uranium resonance absorption or capture. Neutron capture by the isotope $U^{238}$ does not result in fission, but in the creation of $92^{239}$ which by successive loss of beta particles transforms to $93^{239}$ and $94^{239}$, the change being effected with half-lives of 23 minutes and 2.23 days respectively. The element $94^{239}$ is a relatively stable nucleus that is fissionable by thermal neutrons in a similar manner to the response of $U^{235}$ to thermal neutrons.

The capture of neutrons by the $U^{235}$ content of natural uranium not only releases neutrons for maintaining the self-sustaining chain reaction, but also releases fission fragments or products comprising new elements in accordance with the following reaction:

$$_{92}U^{235} + \text{neutron} = A + B + \text{about 2 neutrons (average)}$$

A = "light" fission fragment, e. g., Br, Kr, Rb, Sr, Y, Zr, Cb, Mo, 43, Ru, Rh. Atomic mass, 83–99, inclusive. Atomic number, 35–46, inclusive.

B = "heavy" fission fragment, e. g., Sb, Te, I, Xe, Cs, Ba, La, Ce, Pr, Nd. Atomic mass, 127–141 inclusive. Atomic number, 51–61 inclusive.

These fission fragments are highly radioactive with the emission of gamma rays and are useful as sources of gamma radiation such as for use in X-ray therapy, for radiographic work, and other purposes.

These products of the neutronic reactor, i. e., the fission fragments, $92^{239}$, $93^{239}$ and $94^{239}$ are formed in the uranium while in situ and means must be provided for removing the irradiated uranium from the reactor in order that these reaction products can be separated from the uranium.

The neutron reactor with which this invention is particularly concerned comprises a tank in which is disposed a fluid slurry of the fissionable component in deuterium oxide (heavy water). The slurry comprises a finely divided solid containing uranium usually in the form of an oxide such as $UO_2$, $UO_3$ or $U_3O_8$ or as a carbide. The average particle size of the uranium component generally is below about 2 microns and in general the solid content of the slurry is about 4% volume.

In the operation of the reactor the slurry is circulated through the tank to prevent settling and is cooled by suitable heat exchangers within or without the reactor tank. During operation the particle size of the solids decreases due to the abrasive action of the particles and/or to the neutronic bombardment of the particles thus tending to establish a rather stable suspension.

After neutron irradiation of the suspended particles has proceeded for some time it is generally desirable to separate the solids and recover the plutonium and/or fission products. It is usually found desirable to effect the separation of the particles from the deuterium oxide rapidly in order to avoid excessive overheating by the heat developed within the particles due to their high radioactivity. Moreover it is frequently desirable to effect a rapid separation to permit recovery of short life fission products.

An object of this invention is to provide a rapid method of separating uranium solids from deuterium oxide in which the solids are suspended.

In accordance with the present invention it has been found that a rapid separation may be secured by adding to the slurry of fissionable material in an aqueous medium a water immiscible liquid which preferentially wets the fissionable bodies and permitting stratification of the two liquids to occur. Various agents which wet the suspended uranium solid more readily than deuterium oxide may be used. In general such agents should be liquids which are stable in water or deuterium oxide, should have a density of at least about 1.25, should be free from OH groups where H denotes only light hydrogen and preferably should have a boiling point above about 150° C. Suitable agents for this purpose include ethyl dibromoacetate or other esters of dibromoacetic acid and lower alcohols such as methyl or isopropyl alcohol, esters of salicylic acid such as ethyl salicylate, xylylbromide and chlorinated alkanes such as pentachloroethane.

The amount of wetting agent to be added is capable of some variation depending upon the amount of suspended solids and their settling characteristics. Agents of the type used are but partially miscible with water and the amount used exceed substantially the solubility of the agent in water so that a separate layer or at least a separate liquid phase of the agent is formed. Frequently this amount is equal to or greater in volume than the volume of deuterium oxide which is present.

Following the addition of the agent the mixture is agitated to distribute the agent through the slurry and then the mixture may be allowed to settle. In such a case the liquid agent wets the uranium solid and settles in the form of globules to the bottom of the mixture. These globules may or may not merge to form a continuous organic liquid phase but in any event a separation of the globules from the water occurs and the water may be largely drawn off.

In a preferred embodiment of the invention a liquid agent which is at least partially immiscible with water and which has a density greater than deuterium oxide is added to the slurry to preferentially wet the uranium solids causing them to separate from the deuterium oxide and sink to the bottom of the separation tank. For example, a quantity of an organic liquid such as ethyl dibromoacetate ($Br_2CH.CO_2C_2H_5$) in amount equal to the amount of deuterium oxide present may be added to the slurry in the settling tank and the mixture thoroughly stirred and then allowed to settle. In approximately four minutes the solids will sink to the bottom of the tank so that over 90% of the deuterium oxide can be recovered by decantation. The same mixture of slurry will require from 2½ to 4 hours to settle naturally without the addition of such a wetting agent.

Somewhat more complete separation of the solids and deuterium oxide may be secured if the slurry to be separated is withdrawn from the neutronic reactor and placed in a centrifuge. An amount of ethyl dibromoacetate equal to the amount of deuterium oxide in the slurry is added to the centrifuge. After a few minutes of centrifuging, the solids are separated out and about 99.6 percent of the deuterium oxide can be recovered immediately, while the balance may be recovered by evaporation. In the centrifuge the solids do not form globules, but instead pack in a mass while the ethyl dibromoacetate or other organic liquid forms an intermediate layer between the deuterium oxide and the solids.

After separation of the solids from the deuterium oxide by our process the deuterium oxide may be mixed with finely divided uranium without delay and returned to the neutronic reactor, and thus the time during which the deuterium oxide is held outside the reactor is kept to a minimum. The uranium solids after separation are ready for further processing in which the $93^{239}$, $94^{239}$ and the fission products may be separated before their radioactivity decays beyond the desired point. Thus, it may be seen that we have fulfilled the objects of our invention with a simple, easily adopted process.

While the theory of the separation mechanism set forth herein is based on the best known experimental evidence, we do not wish to be bound by it, as additional experimental data later discovered may modify said theory. The description of the invention is meant to be illustrative only and the scope of the invention is limited only by the appended claims.

We claim:

1. A process for separating uranium-containing solids suspended in a liquid, including the step of adding to said liquid a wetting agent for said solids in an amount sufficient to form a separate liquid phase, said wetting agent having a density greater than the density of said liquid and being selected from the group consisting of halogenated acetic acid ester, salicylic acid ester, halogenated alkane and xylyl bromide.

2. The process of claim 1 wherein the liquid is water.

3. The process of claim 1 wherein the liquid is deuterium oxide.

4. The process of claim 1 wherein the liquid is deuterium oxide and the wetting agent is ethyl dibromoacetate.

5. The process of claim 1 wherein the liquid is deuterium oxide and the wetting agent is xylyl bromide.

6. The process of claim 1 wherein the liquid is deuterium oxide and the wetting agent is pentachloroethane.

7. The process of claim 1 wherein the liquid is deuterium oxide and the wetting agent is salicylic acid ester.

References Cited in the file of this patent

UNITED STATES PATENTS

| | | |
|---|---|---|
| 1,351,265 | Sharples | Aug. 31, 1920 |
| 1,373,219 | Beach | Mar. 29, 1921 |
| 1,492,168 | Hapgood | Apr. 29, 1924 |
| 2,041,885 | Walch | May 26, 1936 |